(12) United States Patent
Croopnick

(10) Patent No.: US 9,273,931 B2
(45) Date of Patent: Mar. 1, 2016

(54) AMORPHOUS ALLOYS ARMOR

(75) Inventor: Gerald A. Croopnick, Coto De Caza, CA (US)

(73) Assignee: Crucible Intellectual Property, LLC, Rancho Santa Margarita, CA (US)

( * ) Notice: Subject to any disclaimer, the term of this patent is extended or adjusted under 35 U.S.C. 154(b) by 865 days.

(21) Appl. No.: 12/615,097

(22) Filed: Nov. 9, 2009

(65) Prior Publication Data

US 2012/0186733 A1    Jul. 26, 2012

(51) Int. Cl.
*F41H 5/04* (2006.01)
*B32B 15/08* (2006.01)
*C22C 1/02* (2006.01)

(52) U.S. Cl.
CPC .............. *F41H 5/0442* (2013.01); *B32B 15/08* (2013.01); *C22C 1/02* (2013.01); *B32B 2571/02* (2013.01); *Y10T 156/1002* (2015.01)

(58) Field of Classification Search
CPC ......... F41H 5/057; F41H 5/0442; F41H 5/04; F41H 5/0421
See application file for complete search history.

(56) References Cited

U.S. PATENT DOCUMENTS

| | | | |
|---|---|---|---|
| 5,288,344 A | 2/1994 | Peker et al. | |
| 5,368,659 A | 11/1994 | Peker et al. | |
| 5,618,359 A | 4/1997 | Lin et al. | |
| 5,735,975 A | 4/1998 | Lin et al. | |
| 6,325,868 B1 | 12/2001 | Kim et al. | |
| 7,157,158 B2 * | 1/2007 | Collier et al. | 428/698 |
| 2007/0093158 A1 * | 4/2007 | Dudt et al. | 442/59 |

* cited by examiner

*Primary Examiner* — Adam Krupicka
(74) *Attorney, Agent, or Firm* — Brownstein Hyatt Farber Schreck, LLP

(57) ABSTRACT

Amorphous alloy armor made of at least one thin layer of bulk-solidifying amorphous alloys and methods of forming such armor are provided. Forming the armor in accordance with the current invention provides ruggedness, a lightweight structure, excellent resistance to chemical and environmental effects, and low-cost manufacturing.

20 Claims, No Drawings

AMORPHOUS ALLOYS ARMOR

RELATED APPLICATIONS

This application claims priority to U.S. Provisional Application No. 61/198,394 filed on Nov. 7, 2008, the disclosure of which is incorporated herein by reference.

FIELD OF THE INVENTION

The present invention is directed to armor made of amorphous alloys and armor systems comprising components made of amorphous alloys.

BACKGROUND OF THE INVENTION

Armor is protective device designed to stop penetrator or to reduce the damage caused by penetrator. For the purposes of this disclosure, penetrator is defined as any object that penetrate, which includes, but is not limited to, nails, knives, ice-picks, mines, bullets, gun-fired projectiles, and shrapnel fragments from explosion.

The most critical aspect of the armor is the capability of stopping or reducing the speed of the penetrator to minimize damage to the host. Generally, the armor must be tough, penetration resistance, light weight, and flexible. Such demanding properties can be achieved cost effectively only with a limited number of materials. Soft vests, made from multiple layers of woven or laminated fibers, Kevlar for example, can protect wearer from small projectiles. Soft vests are unable to protect wearers from stab and slash from a knife, nail, ice-pick, or the like. Adding ceramic or metal plates to the soft vests, it can provide additional protection to the wearers from knives, nails, ice-picks, or the like, and shots fired from rifles; however, the added weight and rigidity make it difficult for the wearer to move about. Furthermore, ceramic has the tendency to break into multiple pieces and cannot take multiple hits.

Accordingly, a need exists for novel materials to be used in armors and armor systems, which can provide remedy to the deficiencies of incumbent materials and structures.

SUMMARY OF THE INVENTION

The present invention is directed to an armor made of amorphous alloy.

In another embodiment of the invention, the amorphous alloy armor comprises multilayer of amorphous alloy and an elastomeric material.

In another embodiment of the invention, the amorphous layer is at least 0.001" thick.

In another embodiment of the invention, the amorphous layer is between 0.001" to 0.004" thick.

In still yet another embodiment of the invention, the amorphous alloy is described by the following molecular formula: $(Zr,Ti)_a(Ni,Cu,Fe)_b(Be,Al,Si,B)_c$, wherein "a" is in the range of from 30 to 75, "b" is in the range of from 5 to 60, and "c" is in the range of from 0 to 50 in atomic percentages.

In still yet another embodiment of the invention, the amorphous alloy is described by the following molecular formula: $(Zr,Ti)_a(Ni,Cu)_b(Be)_c$, wherein "a" is in the range of from 40 to 75, "b" is in the range of from 5 to 50, and "c" is in the range of from 5 to 50 in atomic percentages.

In still yet another embodiment of the invention, the amorphous alloy can sustain strains up to 1.5% or more without any permanent deformation or breakage.

In still yet another embodiment of the invention, the bulk solidifying amorphous alloy has a high fracture toughness of at least 20 ksi-in$^{0.5}$.

In still yet another embodiment of the invention, the bulk solidifying amorphous alloy has a ΔT of 60° C. or greater.

In still yet another embodiment of the invention, the bulk solidifying amorphous has a hardness of 7.5 Gpa and higher.

In another alternative embodiment, the invention is also directed to methods of manufacturing armor from amorphous alloys.

DESCRIPTION OF THE INVENTION

The current invention is directed to armor preferably made of multiple thin layers of amorphous alloy bonded together. The amorphous alloys provide ruggedness, lightweight structure, excellent resistance to chemical and environmental effects, shatter resistance and multiple shots capability. Another object of the current invention is a method of making armor from such amorphous alloys.

Bulk solidifying amorphous alloys are a recently discovered family of amorphous alloys, which can be cooled at substantially lower cooling rates, of about 500 K/sec or less, and substantially retain their amorphous atomic structure. As such, they can be produced in thicknesses of 1.0 mm or more, substantially thicker than conventional amorphous alloys, which are typically limited to thicknesses of 0.020 mm, and which require cooling rates of $10^5$ K/sec or more. U.S. Pat. Nos. 5,288,344; 5,368,659; 5,618,359; and 5,735,975, the disclosures of which are incorporated herein by reference in their entirety, disclose such bulk solidifying amorphous alloys.

A family of bulk solidifying amorphous alloys can be described as $(Zr,Ti)_a(Ni,Cu,Fe)_b(Be,Al,Si,B)_c$, where a is in the range of from 30 to 75, b is in the range of from 5 to 60, and c is in the range of from 0 to 50 in atomic percentages. Furthermore, these basic alloys can accommodate substantial amounts (up to 20% atomic, and more) of other transition metals, such as Nb, Cr, V, Co. A preferable alloy family is $(Zr,Ti)_a(Ni,Cu)_b(Be)_c$, where a is in the range of from 40 to 75, b is in the range of from 5 to 50, and c is in the range of from 5 to 50 in atomic percentages. Still, a more preferable composition is $(Zr,Ti)_a(Ni,Cu)_b(Be)_c$, where a is in the range of from 45 to 65, b is in the range of from 7.5 to 35, and c is in the range of from 10 to 37.5 in atomic percentages. Another preferable alloy family is $(Zr)_a(Nb,Ti)_b(Ni,Cu)_c(Al)_d$, where a is in the range of from 45 to 65, b is in the range of from 0 to 10, c is in the range of from 20 to 40 and d is in the range of from 7.5 to 15 in atomic percentages.

Another set of bulk-solidifying amorphous alloys are ferrous metals (Fe,Ni,Co) based compositions. Examples of such compositions are disclosed in U.S. Pat. No. 6,325,868 and in publications to (A. Inoue et. al., Appl. Phys. Lett., Volume 71, p 464 (1997)), (Shen et. al., Mater. Trans., JIM, Volume 42, p 2136 (2001)), and Japanese patent application 2000126277 (Publ. #2001303218 A), all of which are incorporated herein by reference. One exemplary composition of such alloys is $Fe_{72}Al_5Ga_2P_{11}C_6B_4$. Another exemplary composition of such alloys is $Fe_{72}Al_7Zr_{10}Mo_5W_2B_{15}$. Although, these alloy compositions are not processable to the degree of the Zr-base alloy systems, they can still be processed in thicknesses of 1.0 mm or more, sufficient enough to be utilized in the current invention.

Bulk-solidifying amorphous alloys have typically high strength and high hardness. For example, Zr and Ti-base amorphous alloys typically have yield strengths of 250 ksi or higher and hardness values of 450 Vickers or higher. The ferrous-base version of these alloys can have yield strengths up to 500 ksi or higher and hardness values of 1000 Vickers and higher. As such, these alloys display excellent strength-to-weight ratio especially in the case of Ti-base and Fe-base alloys. Furthermore, bulk-solidifying amorphous alloys have good corrosion resistance and environmental durability, especially the Zr and Ti based alloys. Amorphous alloys generally have high elastic strain limit approaching up to 2.0%, much higher than any other metallic alloy.

In general, crystalline precipitates in bulk amorphous alloys are highly detrimental to the properties of amorphous alloys, especially to the toughness and strength of these alloys, and as such, it is generally preferred to minimize the volume fraction of these precipitates. However, there are cases in which, ductile crystalline phases precipitate in-situ during the processing of bulk amorphous alloys, which are indeed beneficial to the properties of bulk amorphous alloys, especially to the toughness and ductility of the alloys. Such bulk amorphous alloys comprising such beneficial precipitates are also included in the current invention. One exemplary case is disclosed in (C. C. Hays et. al., Physical Review Letters, Vol. 84, p 2901, 2000), which is incorporated herein by reference.

By using these bulk-solidifying amorphous alloys, the armor of the present invention has characteristics that are much improved over conventional metallic armor made of ordinary metallic materials or ceramic armor. The surprising and novel advantages of using bulk-solidifying amorphous alloys in producing armor will be described in various embodiments below.

First, the unique amorphous atomic structure of the bulk solidifying amorphous alloys provides a grain boundary free microstructure, wherein fracture toughness and dent resistance can be achieved substantially better than conventional metallic alloys. The ability to make armors with isotropic characteristics is very important. Generally, non-isotropy in metallic articles causes degraded performance for those portions of metallic articles that require precision fit, such as in the contact surfaces of the formed metallic armor due to variations in temperature, mechanical forces, and vibration experienced across the article. Moreover, the non-uniform response of ordinary metals in various directions would also require extensive design margins to compensate, and as such would result in heavy and bulky structures. Accordingly, the isotropic response of the armor in accordance with the present invention is crucial, at least in certain designs, given the intricate and complex patterns and the associated large surface areas and very small thicknesses of the armor, as well as the need to utilize high strength construction material. For example, castings of ordinary alloys are typically poor in mechanical strength and are distorted in the case of large surface area and very small thickness. Accordingly, using metallic alloys for casting such large surface areas with high tolerance in flatness (or precisely curved shapes) is not generally feasible. In addition, for ordinary metallic alloys, extensive rolling operations would be needed to produce the metallic armor sheet in the desired flatness and with the desired high strength. However, in this case the rolled products of ordinary high-strength alloys generate strong orientation, and as such lack the desirable isotropic properties. Indeed, such rolling operations typically result in highly oriented and elongated crystalline grain structures in metallic alloys resulting in highly non-isotropic material. In contrast, bulk-solidifying amorphous alloys, due to their unique atomic structure lack any microstructure as observed in crystalline and grainy metal, and as a result articles formed from such alloys are inherently isotropic.

Secondly, the combination of high strength and high strength-to-weight ratio of the bulk solidifying amorphous alloys significantly reduces the overall weight and bulkiness of the armor of the current invention, thereby allowing for the reduction of the thickness of these armors without jeopardizing the structural integrity and operation of the armor systems into which these amorphous metal armors are integrated. The ability to fabricate amorphous with thinner cross section is also important in reducing the bulkiness of the armor system and increasing the efficiency per volume of the armor system. This increased efficiency is particularly useful for the application that required a lot of mobility.

Although other materials, such as ceramic, are considered in these armor applications, there are major fabrication and assembly deficiencies with those materials. For example, ceramic based armor lack any flexibility and are therefore actually jeopardize the mobility and safety of the wearers. Furthermore, ceramic armors are prone to shatter upon impact and therefore cannot take multiple impacts on the same spot. Shatter ceramic armor can actually hurt or injure the wearers. Other conventional metallic alloys, although not brittle, however, are prone to permanent deformation, denting and scratching due to low hardness values. The very large surface area and very small thicknesses of the armor makes such problems even more significant. However, bulk-solidifying amorphous alloys have reasonable fracture toughness, on the order of 20 ksi-sqrt(in), and high elastic strain limit, approaching 2%. As the thicknesses of the armor decrease, amorphous alloy armor can achieve elastic limit that is much higher than 2% easily. Accordingly, high flexibility can be achieved without permanent deformation and denting of the amorphous alloy armor and high hardness of bulk solidifying amorphous alloys provide better resistance against permanent deformation of the armor. As such, metallic armor made of bulk-solidifying amorphous alloys can be fabricated and assembled with a reduced cost and better performance.

As discussed, bulk solidifying amorphous alloys have very high elastic strain limits, typically around 1.5% or higher. This is an important characteristic for the use and application of armor. Specifically, high elastic strain limits are preferred applications subject to mechanical loading or vibration. A high elastic strain limit allows the armor to take even more intricate shape and to be thinner and lighter, high elastic strain limits also allow the armor to sustain loading and flexing without permanent deformation or destruction of the device, especially during movement and impact.

In addition, armor made of bulk solidifying amorphous alloy also have good corrosion resistance and high inertness. The high corrosion resistance and inertness of these materials are useful for preventing the armor from being decayed by undesired chemical reactions between the armor and the environment.

Another function of the armor is to provide structural rigidity and complex patterns of back structure to provide a stiff support. The high strength, high elastic strain limit of the bulk amorphous alloys allow for the ready production of armor with relatively high integrity back structures. As discussed below, the near-to-net shape forming ability of the bulk solidifying alloys allows the use design features, such as ribs and ridges, to improve the stiffness and structural integrity of the support structures and armor systems.

As discussed previously, in a particularly preferred embodiment, the total thickness of the armor is not formed from a single sheet of amorphous alloy, but is rather formed from a number of thinner amorphous alloy sheets that are bonded together using an elastomeric material. In one such embodiment, each of the individual layers has a thickness of between 0.001 and 0.004 inches. It has been surprisingly discovered that such a multi-layer armor structure has an improved ability to resist impact damage without failing.

Another object of the invention is providing a method to produce armor in net-shape form from bulk solidifying amorphous alloys. By producing armor in net-shape form manufacturing costs can be significantly reduced while still forming armor with good precision.

One exemplary method of making such armor comprises the following steps:

1) Providing a sheet feedstock of amorphous alloy being substantially amorphous, and having an elastic strain limit of about 1.5% or greater and having a ΔT of 30° C. or greater;
2) Heating the feedstock to around the glass transition temperature;
3) Shaping the heated feedstock into the desired shape; and
4) Cooling the formed sheet to temperatures far below the glass transition temperature.
5) Multiple layers of amorphous metal armors are bonded together using an elastomer material or the like.

Herein, ΔT is given by the difference between the onset of crystallization temperature, $T_x$, and the onset of glass transition temperature, $T_g$, as determined from standard DSC (Differential Scanning calorimetry) measurements at typical heating rates (e.g. 20° C./min).

Preferably ΔT of the provided amorphous alloy is greater than 60° C., and most preferably greater than 90° C. The provided sheet feedstock can have about the same thickness as the average thickness of the final amorphous alloy armor. Moreover, the time and temperature of the heating and shaping operation is selected such that the elastic strain limit of the amorphous alloy is substantially preserved to be not less than 1.0%, and preferably not being less than 1.5%. In the context of the invention, temperatures around glass transition means the forming temperatures can be below glass transition, at or around glass transition, and above glass transition temperature, but always at temperatures below the crystallization temperature $T_x$. The cooling step is carried out at rates similar to the heating rates at the heating step, and preferably at rates greater than the heating rates at the heating step. The cooling step is also achieved preferably while the forming and shaping loads are still maintained.

Another exemplary method of making amorphous metal armor in accordance with the present invention comprises the following steps:

1) Providing a homogeneous alloy feedstock of amorphous alloy (not necessarily amorphous);
2) Heating the feedstock to a casting temperature above the melting temperatures;
3) Introducing the molten alloy into shape-forming mold; and
4) Quenching the molten alloy to temperatures below glass transition.
5) Multiple layers of amorphous metal armors are bond together using elastomer or alike.

Bulk amorphous alloys retain their fluidity from above the melting temperature down to the glass transition temperature due to the lack of a first order phase transition. This is in direct contrast to conventional metals and alloys. Since, bulk amorphous alloys retain their fluidity, they do not accumulate significant stress from their casting temperatures down to below the glass transition temperature and as such dimensional distortions from thermal stress gradients can be minimized. Accordingly, amorphous alloy armor s with large surface area and small thickness can be produced cost-effectively.

Although specific embodiments are disclosed herein, it is expected that persons skilled in the art can and will design alternative amorphous alloy amorphous alloy armor s and methods to produce the amorphous alloy amorphous alloy armor s that are within the scope of the following claims either literally or under the Doctrine of Equivalents.

What is claimed is:

1. A device comprising:
    at least two layers comprising a bulk solidifying amorphous alloy; and
    an elastomeric material layer, located between said at least two layers of the bulk solidifying amorphous alloy; wherein:
    the bulk solidifying amorphous alloy sustains strains up to 1.5% or more without any permanent deformation or breakage; and
    the at least two layers of bulk solidifying amorphous alloy and the elastomeric material layer each have a thickness of between 0.001 and 0.004 inches.

2. The device of claim 1, wherein a surface of at least one of the at least two layers further comprises a deposited coating layer comprised of one or more metals.

3. The device of claim 1, wherein the amorphous alloy is described by the following molecular formula: $[Zr, Ti]_a[Ni, Cu, Fe]_b[Be, Al, Si, B]_c$, wherein "a" is in the range of from 30 to 75, "b" is in the range of from 5 to 60, and "c" is in the range of from 0 to 50 in atomic percentages.

4. The device of claim 1, wherein the amorphous alloy is described by the following molecular formula: $[Zr, Ti]_a[Ni, CU]_b[Be]_c$, wherein "a" is in the range of from 40 to 75, "b" is in the range of from 5 to 50, and "c" is in the range of from 5 to 50 in atomic percentages.

5. The device of claim 1, wherein the amorphous alloy amorphous alloy has a ΔT of 60° C. or greater.

6. The device of claim 1, wherein the amorphous alloy has a hardness of 7.5 Gpa and higher.

7. The device of claim 1, wherein the device is a near-to-net shape form device comprising design features to improve the stiffness and structural integrity of the device.

8. The device of claim 1, wherein the bulk solidifying amorphous alloy comprises a ferrous metal.

9. A device system wherein at least a component of the device system comprises:
    at least two layers comprising a bulk solidifying amorphous alloy; and
    an elastomeric material layer, located between the at least two layers of the plurality of layers of the bulk solidifying amorphous alloy; wherein:
    the bulk solidifying amorphous alloy sustains strains up to 1.5% or more without any permanent deformation or breakage; and
    the bulk solidifying amorphous alloy layers and the elastomeric material layer each have a thickness of between 0.001 and 0.004 inches.

10. The device system of claim 9, wherein the amorphous alloy is described by the following molecular formula: $[Zr, Ti]_a[Ni, Cu, Fe]_b[Be, Al, Si, B]_c$, wherein "a" is in the range of from 30 to 75, "b" is in the range of from 5 to 60, and "c" is in the range of from 0 to 50 in atomic percentages.

11. The device system of claim 9, wherein the amorphous alloy is described by the following molecular formula: $[Zr, Ti]_a[Ni, Cu]_b[B]_c$, wherein "a" is in the range of from 40 to 75, "b" is in the range of from 5 to 50, and "c" is in the range of from 5 to 50 in atomic percentages.

12. The device system of claim 9, wherein the device system is a near-to-net shape form device system comprising design features to improve the stiffness and structural integrity of the device system.

13. The device system of claim 9, wherein the bulk solidifying amorphous alloy comprises a ferrous metal.

14. The device system of claim 9, wherein the bulk solidifying amorphous alloy comprises a ferrous metal comprising Fe, Ni and Co.

15. The device of claim 9, wherein the device system consists essentially of the bulk solidifying amorphous alloy and the elastomeric material.

16. A device comprising:
    a first layer comprising a bulk solidifying amorphous alloy;
    a second layer comprising the bulk solidifying amorphous alloy; and
    a third layer comprising an elastomeric material disposed between the first layer and the second layer; wherein:
    the bulk solidifying amorphous alloy sustains strains up to 1.5% or more without any permanent deformation or breakage; and
    the first, second, and third layers each have a thickness of between 0.001 and 0.004 inches.

17. The device system of claim 16, wherein the amorphous alloy has a fracture toughness of at least 20ksi-in$^{0.5}$.

18. The device system of claim 16, wherein the amorphous alloy amorphous alloy has a $\Delta T$ of 60° C. or greater.

19. The device of claim 16, wherein the bulk solidifying amorphous alloy comprises a ferrous metal comprising Fe, Ni and Co.

20. The device of claim 16, wherein the device consists essentially of the bulk solidifying amorphous alloy and the elastomeric material.

* * * * *